No. 641,980.   Patented Jan. 23, 1900.
W. W. LOWER.
HIGH SPEED GEAR FOR BICYCLES.
(Application filed Apr. 23, 1898.)
(No Model.)  2 Sheets—Sheet 1.
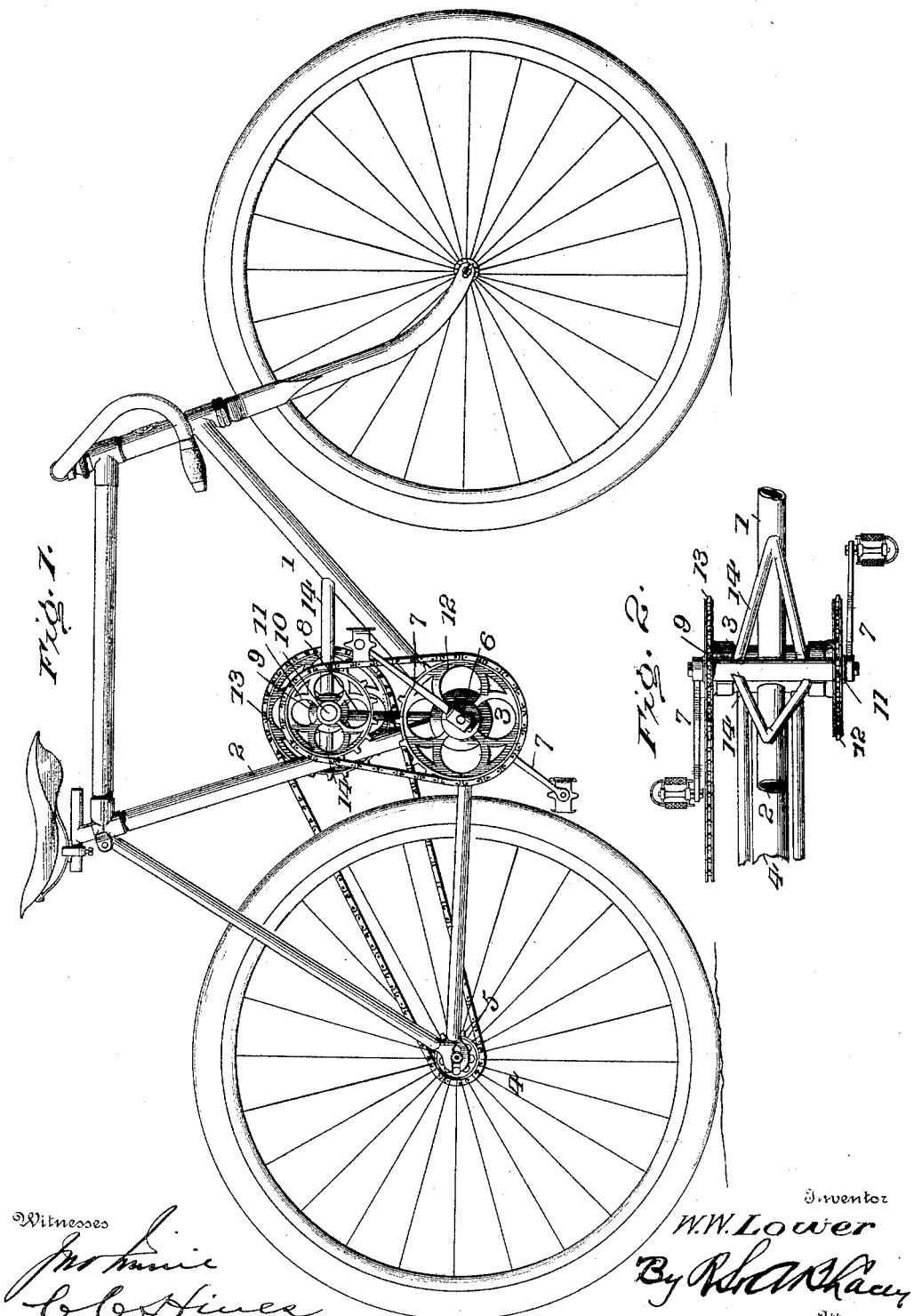

No. 641,980. Patented Jan. 23, 1900.
W. W. LOWER.
HIGH SPEED GEAR FOR BICYCLES.
(Application filed Apr. 23, 1898.)
(No Model.) 2 Sheets—Sheet 2.

Witnesses
Inventor
W. W. Lower
By R. S. & A. B. Lacey,
Attorneys

UNITED STATES PATENT OFFICE.

WARREN W. LOWER, OF BLUE RIDGE SPRINGS, VIRGINIA, ASSIGNOR OF ONE-HALF TO DAVID I. L. BACHMAN, OF ROANOKE, VIRGINIA.

HIGH-SPEED GEAR FOR BICYCLES.

SPECIFICATION forming part of Letters Patent No. 641,980, dated January 23, 1900.

Application filed April 23, 1898. Serial No. 678,625. (No model.)

*To all whom it may concern:*

Be it known that I, WARREN W. LOWER, a citizen of the United States, residing at Blue Ridge Springs, in the county of Botetourt and State of Virginia, have invented certain new and useful Improvements in High-Speed Gear for Bicycles; and I do hereby declare the following to be a full, clear, and exact description of the invention, such as will enable others skilled in the art to which it appertains to make and use the same.

This invention relates to high-speed gear for bicycles; and it consists of the details of construction and arrangement of the several parts which will be more fully hereinafter described and claimed.

The objects of the invention are to attain a high speed and increased power without necessitating a rapid pedaling action or great strain on the part of the rider and to materially reduce the ordinary amount of manual power expended in operating the gearing of a bicycle through the pedals thereof and adapt a bicycle embodying the improved construction for easy hill-climbing or other ordinary work.

Figure 3:
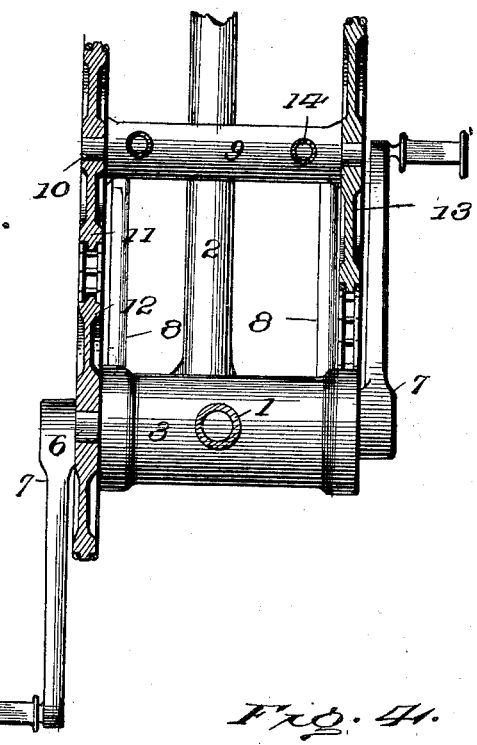
Figure 4:
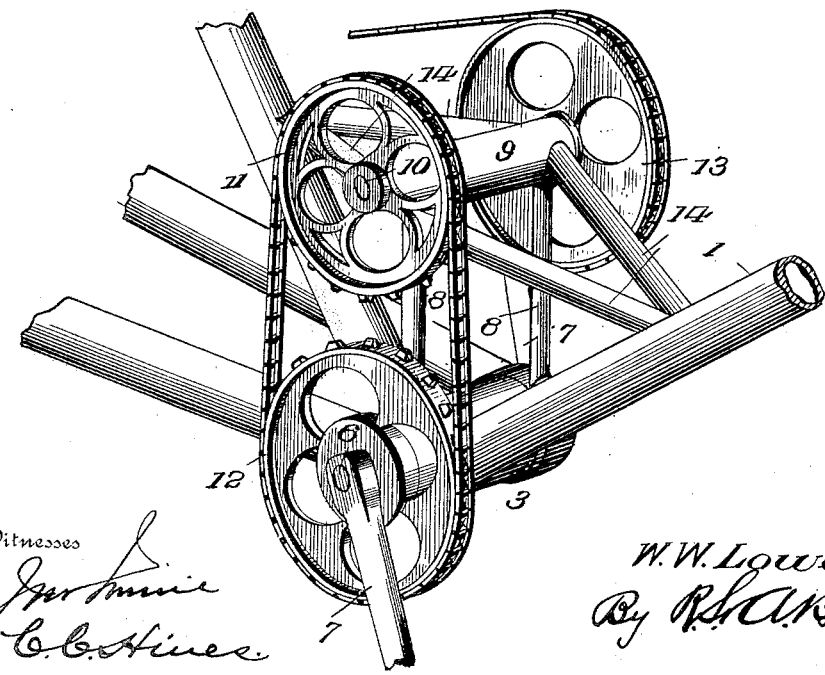

In the accompanying drawings, Figure 1 is a side view of a bicycle embodying the invention. Fig. 2 is a top plan view of the same. Fig. 3 is a partial transverse section of the improved driving-gear. Fig. 4 is a detail perspective view of the improved attachment.

Referring to the drawings, wherein similar numerals of reference are employed to indicate corresponding parts in the several views, the numeral 1 designates the front frame-tube, and 2 a rear drop-tube, both of said tubes at their lower portions being connected to a crank-hanger 3 and from which also extend the other usual parts of a bicycle, running to the rear on opposite sides of the drive-wheel 4. The drive-wheel 4 has on one side thereof a rear drive-sprocket 5, and in the crank-hanger 3 is mounted a crank-shaft 6, to opposite ends of which the pedal-arms 7 are secured in the ordinary manner and in proper relative positions.

Rising from opposite ends of the crank-hanger 3 are brace-standards 8, which support the bearing or hanger 9 of a supplemental shaft 10, on one end of which is keyed a sprocket-wheel 11, located directly over and in alinement with the drive-sprocket 12, which, as will be understood, is secured to the crank-shaft 6. On the opposite end of the supplemental shaft 10 a sprocket-wheel 13 is fixed, which is larger than the sprocket-wheel 11 and the latter smaller than the sprocket-wheel 12. A chain runs from the drive-sprocket 12 to the sprocket-wheel 11, and from the sprocket-wheel 13 a belt similar to that usually employed runs to the rear drive-sprocket 5.

To thoroughly brace the hanger 9, opposite V-shaped braces 14 are secured thereto and extend, respectively, to the front frame-tube 1 and the rear drop-tube 2. These braces are arranged horizontally and form an auxiliary diamond frame to resist a forward or backward strain or pull brought to bear upon the hanger 9, while the brace-standards 8 resist a downward pull or strain.

The attachment to the ordinary driving mechanism, as set forth, is so arranged as to be confined in a small space to avoid forming laterally-interfering projections on opposite sides and will not therefore discommode or interfere with the operation of the pedals by the rider.

It is intended to have the standards 8 so constructed that they may be easily applied to the machines now in use, and in this instance also the braces 14 are to have attaching means thereon for securement to the tubes 1 and 2. This is an obvious construction, and it does not involve any departure from the spirit of the invention, for it will be understood that in the primary manufacture of bicycles embodying the improved attachment the said standards and braces 14 will be preferably firmly secured to the crank-hanger 3 and the tubes 1 and 2 by the ordinary means employed in connecting the separate parts of bicycles.

The efficiency of the attachment will be readily apparent to those skilled in the art, and the gearing will be so timed that a single revolution of the drive-sprocket 12 will be multiplied or increased by the sprocket-wheels 11 and 13 and transmitted to the rear drive-sprocket 5. This will require slower pedaling for the same amount of speed, and thereby ease the rider. It will also be understood that rapid pedaling will be correspondingly multiplied and a much greater speed obtained.

Changes in the dimensions, proportions, and details other than those noted may also be made without departing from the nature of the invention or sacrificing any of the advantages thereof.

Having thus described the invention, what is claimed as new is—

1. The combination, with the frame of a bicycle having the usual lower main tube 1 and diagonal down-tube 2 converging toward each other and connected at their point of juncture to a crank-hanger 3, and a crank-shaft 6 rotatable in said hanger, of brace-standards 8 rising perpendicularly from opposite ends of the said hanger and connected to opposite ends of an upper hanger 9 directly above and parallel with the said lower hanger, opposite V-shaped braces 14 having their converged portions respectively connected to the tubes 1 and 2 and their divergent ends secured to opposite sides of said upper hanger adjacent to the ends thereof and forming a diamond-shaped auxiliary frame to firmly support the upper hanger above the crotch of the tubes in advance of the tube 2 and between the tubes 1 and 2 and to concentrate the forward strain in the line of the frame, a second crank-shaft 10 in the upper hanger, an ordinary drive sprocket-wheel 12 on one end of the lower crank-shaft, a sprocket-wheel 11 on the adjacent end of the upper crank-shaft which is smaller and directly over and operatively connected to the lower sprocket-wheel, and a sprocket-wheel 13 on the opposite end of the upper crank-shaft larger than said sprocket-wheel 11 and operatively connected to the rear drive-wheel of the machine, whereby all parts of the attachment are supported by that portion of the frame offering the greatest resistance to a downward and forward strain and without modifying the ordinary power-receiving structural features of the bicycle, substantially as shown and described.

2. In a bicycle, the combination, with the ordinary diamond frame having the usual main and diagonal down-tubes converging at their lower ends and connected to the crank-hanger, of an auxiliary gearing-supporting frame comprising a pair of brace-standards rising perpendicularly from opposite ends of the crank-hanger, a supplemental crank-hanger connected to the upper ends of said standards and extending transversely of the frame in parallelism with and above the main or first-named crank-hanger, and V-shaped braces arranged horizontally upon opposite sides of the supplemental hanger and having their converged portions respectively connected to the said lower main and diagonal down-tubes and their divergent ends respectively connected to the supplemental hanger adjacent to the ends of the latter, substantially as described.

In testimony whereof I affix my signature in presence of two witnesses.

WARREN W. LOWER.

Witnesses:
 J. W. BOSWELL,
 S. W. HARRELL.